May 13, 1969 N. CODA 3,444,436

MOUNTED CAPACITOR WITH SPACED TERMINAL FEET

Filed April 26, 1967

INVENTOR

Nello Coda

BY Ralph Hamman

ATTORNEY

United States Patent Office 3,444,436
Patented May 13, 1969

3,444,436

MOUNTED CAPACITOR WITH SPACED TERMINAL FEET

Nello Coda, Erie, Pa., assignor to Erie Technological Products, Inc., Erie, Pa., a corporation of Pennsylvania Filed Apr. 26, 1967, Ser. No. 633,931
Int. Cl. H02b *1/04*
U.S. Cl. 317—101 10 Claims

ABSTRACT OF THE DISCLOSURE

A capacitor with spaced feet mounted on a printed circuit board or the like in which the capacitor terminals comprise conductive extensions of the electrodes to the supporting surfaces of the feet.

This invention is a capacitor adapted to stand upright on a printed circuit board or the like. The feet which support the capacitor also comprise the capacitor terminals which are formed by conductive extensions of the capacitor electrodes to the supporting surfaces of the feet. The main body of the capacitor is above the supporting surfaces of the feet so that the space between the capacitor terminals is open for cleaning under the capacitor and running wiring patterns between the terminals.

Figure 1:
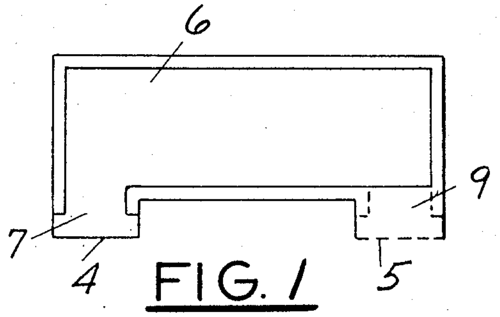
Figure 3:
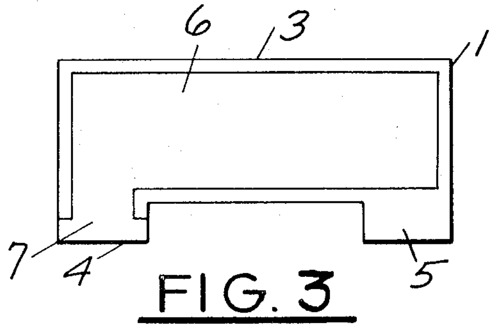
Figure 2:
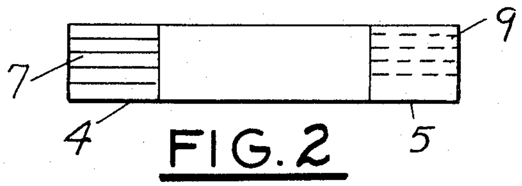
Figure 4:
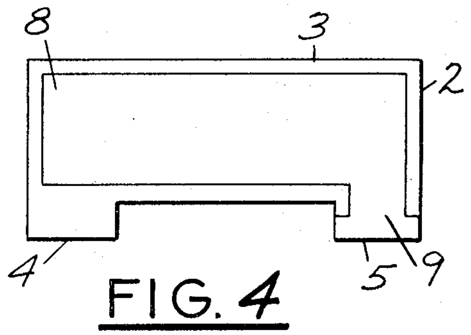
Figure 5:
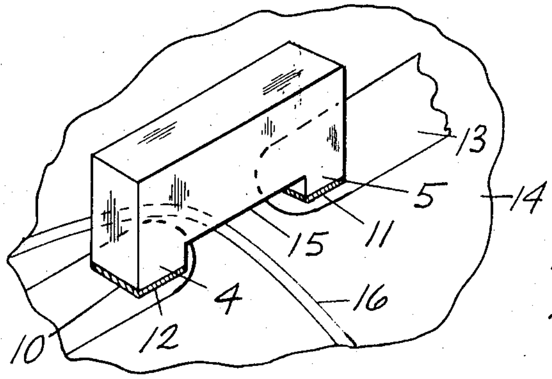
Figure 6:
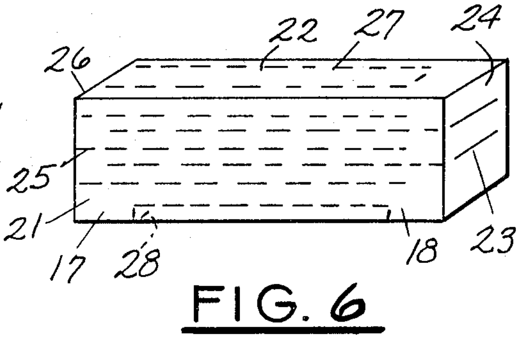
Figure 7:
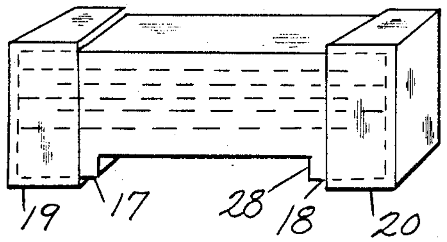

In the drawing, FIG. 1 is a diagrammatic side elevation of a preferred form of capacitor, FIG. 2 is a bottom view of the capacitor, FIGS. 3 and 4 are plan views of the green ceramic layers from which the capacitor is made, FIG. 5 is a fragmentary perspective of a surface of a printed circuit board to which the capacitor is soldered, FIG. 6 is a perspective of a modification prior to ceramic firing, and FIG. 7 is a perspective of the finished capacitor.

The preferred form of capacitor is made from layers 1 and 2 of green ceramic such as shown in FIGS. 3 and 4. The layers are preferably of one of the high dielectric constant titanate ceramics and typically will have a thickness of one to six mils depending upon the voltage rating. Each of the layers is of the same size and comprises a body portion 3 and foot portions 4 and 5. The layer 1 has an electrode 6 of metal paint, usually one of the high temperature precious metal or alloy paints such as those containing platinum or palladium which mature at the high firing temperatures required of the green ceramic. The preparation of and the metal paints for the thin green ceramic layers are well known. The electrode 6 applied to the layer 1 has a terminal extension 7 to the edge of the foot portion 4. The layer 2 has an electrode 8 with a terminal extension 9 to the edge of the foot portion 5.

In the manufacture, the electrode green ceramic layers 1 and 2 are stacked one on top of the other with the electrodes 6 and 8 alternating. Plain unelectroded sheets are used at the ends of the stack. A sufficient number of layers is stacked to provide the desired capacity. After stacking, the electrodes 6 and 8 are embedded within the ceramic and the terminal extensions 7 and 9 extend edgewise to the outer surface of the foot sections 4 and 5 as shown in FIG. 2. In FIG. 2, the electrode extensions 7 are shown in full lines and the electrode extensions 9 are shown in dotted lines merely to identify the electrode extensions. Similarly, in FIG. 1 the electrodes 6 and its extensions 7 are shown in full lines and the electrode extension 9 of the electrode 8 is shown in dotted lines, although both electrodes 6 and 8 are embedded within the stacked layers of ceramic. The main body of the electrode 8 is behind the main body of the electrode 6 and is separated therefrom by the intervening layer of ceramic dielectric so that it is not feasible to show the main body of the electrode 8 in FIG. 1.

After stacking, the layers are fired to mature the ceramic and the metal paint electrodes. The firing temperature is determined by the choice of green ceramic dielectric. The choice of the metal paint for the electrodes is also dependent upon the choice of the ceramic dielectric. These are factors well understood in the art. During firing, the green ceramic layers 1 and 2 coalesce, forming a sealed monolithic structure in which the main body portions of the electrodes 6 and 8 are completely hermetically embedded or enclosed and the edges of the extensions 7 and 9 extend to the outer surfaces of the foot portions 4 and 5. If desired, after firing, the bottom surfaces of the foot portions 4 and 5 may be abraded or ground flat and given a thin silver or other coating to provide a solderable surface. The abrading operation is simple because both surfaces are in a single plane. The silver coating may be one of the silver ceramic paints such as used for capacitor electrodes. The silver coating need not extend over the edge of the foot portions 4, 5, but need only cover the bottom surfaces.

FIG. 5 shows one of the capacitors with the bottom surfaces of foot sections 4, 5 respectively rest on and are connected by solder 10, 11 to the upper surfaces of metal patterns 12, 13 on a printed circuit board 14. The feet 4, 5 provide a stable support for the capacitor. The center section 15 of the capacitor is elevated above the surface of the printed circuit board 14 which permits cleaning under the capacitor and also permits the running of wiring patterns between the feet 4, 5 such as indicated at 16. When installed, the entire capacitor electrode system is hermetically sealed within the ceramic and the capacitor terminals are directly connected to the wiring pattern 12, 13 by solder. This provides a connection of lower cost and greater reliability.

In the modification of FIGS. 6 and 7, the capacitor is of the same general shape but may be of lower profile because the capacitor electrodes are in planes generally parallel rather than edgewise to the supporting surfaces of the feet. The capacitor has feet 17 and 18 which support the capacitor in the same manner as the feet 4, 5. The feet have terminal portions 19, 20 which may be soldered to the printed circuit board in the same manner as the terminal extensions 7, 9. The differences are in the internal structure and in the mode of manufacture.

At the first stage of manufacture shown in FIG. 6, the capacitor comprises a plurality of layers of green ceramic stacked one on top of the other. On the side which is to have the feet 17, 18, there is a relatively thick layer 21 of unelectroded green ceramic having a total thickness slightly greater than the height of the feet. The layer 21 may be a single thick layer or may conveniently comprise several thin layers each from 1 to 6 mils thick stacked on top of each other. On top of the layer 21 are a plurality of layers of green ceramic, each from 1 to 6 mils thick and each having on its upper surface a capacitor electrode of the shape indicated in dotted lines 22. For convenience of illustration, the layers are not illustrated and the electrode associated on the upper surface of each layer is shown in dotted lines on the sides and top of the capacitor to indicate the relative relation of the capacitor electrodes. With the rectangular shape of the capacitor shown, the electroded green ceramic layers may be of identical shape and may merely be turned end for end as they are stacked to produce a capacitor in which electrodes 23 extend to end surface 24 and electrodes 25 extend to end surface 26. Each of the electrodes 23 and 25 is margined inward from its dielectric layer to provide an insulating band such as shown at 27. After stacking, the green ceramic layers are pressed together, providing a homogeneous block and while the block is still in the green state, a slot, indicated by dotted lines 28, is milled transversely through the layer 21 to provide the foot sections 17, 18 at opposite ends. Other means may be used to form the feet 17, 18. For example, the feet may be formed by reflow of the green ceramic during pressing. After firing, the end surfaces of the ceramic block are sand blasted or abraded to remove any glaze which may have accumulated over the exposed edges of the electrodes 23 and 25. The ends of the block are then dipped in a metallizing paint, such as one of the silver ceramic paints, and fired to provide the conductive terminal portions 19, 20 which connect the edges of the electrodes 23, 25 to a terminal section on the under surface of the feet 17, 18. The terminal portions 19, 20 may be soldered to the printed circuit board in the manner shown in FIG. 5 or in any other desired manner. The space between the feet 17, 18 provided by the slot 28 allows the capacitor to overlie other conductors or components on the printed circuit board.

What is claimed as new is:

1. A capacitor comprising a dielectric body having feet laterally spaced from each other and depending below the section of the body between the feet, said feet having bottom supporting surfaces for supporting the capacitor on the upper surface of a printed circuit board or the like, capacitor electrodes having terminal extensions extending to said bottom supporting surfaces, and means for soldering said bottom supporting surfaces to the upper surface of a printed circuit board or the like by solder in contact with said extensions whereby the feet also serve as capacitor terminals.

2. The capacitor of claim 1 in which the electrodes and terminal extensions extend edgewise to said supporting surfaces.

3. The capacitor of claim 1 in which the electrodes are in planes generally parallel to said supporting surfaces.

4. The capacitor of claim 2 in which the body comprises a homogeneous laminate of green ceramic layers each carrying on one surface a metal paint electrode and a metal paint terminal extension for the electrode, the layers being stacked in face to face contact and fired to coalesce the ceramic and mature the metal paint electrodes and terminal extensions to provide a monolithic structure.

5. The capacitor of claim 1 in which the body comprises a laminate of green ceramic layers having electrode and terminal extensions in the form of a metal paint on said layers and the layers being stacked in face to face contact and fired to coalesce the ceramic and provide a monolithic structure.

6. The capacitor of claim 5 in which the terminal extensions extend to a surface of the body above the feet and in which a metallized coating on the body extends from the supporting surfaces of the feet into contact with the terminal extensions.

7. The capacitor of claim 5 in which the feet are formed by cutting a slot through unelectroded areas between the ends of the body.

8. The capacitor of claim 1 in which the bottom supporting surfaces of the feet rest on and are soldered to the upper surfaces of metal patterns on a printed circuit board.

9. The capacitor of claim 2 in which the bottom supporting surfaces of the feet rest on and are soldered to the upper surfaces of metal patterns on a printed circuit board.

10. The capacitor of claim 3 in which the bottom supporting surfaces of the feet rest on and are soldered to the upper surfaces of metal patterns on a printed circuit board.

References Cited

UNITED STATES PATENTS

| | | | |
|---|---|---|---|
| 2,668,932 | 2/1954 | Kliever | 317—101 |
| 3,189,974 | 6/1965 | Fabricius. | |
| 3,235,939 | 2/1966 | Rodriguez. | |
| 3,274,468 | 9/1966 | Rodriguez | 317—242 |
| 3,360,701 | 12/1967 | Dornfeld | 317—261 X |

FOREIGN PATENTS

| | | |
|---|---|---|
| 880,249 | 10/1961 | Great Britain. |

LEWIS H. MYERS, *Primary Examiner.*

E. A. GOLDBERG, *Assistant Examiner.*

U.S. Cl. X.R.

317—242, 261